(12) United States Patent
Guo et al.

(10) Patent No.: US 12,244,261 B2
(45) Date of Patent: Mar. 4, 2025

(54) DETACHABLE ROOF INTEGRATED SOLAR PHOTOVOLTAIC MODULE

(71) Applicant: PV Technical Services Inc., Saint George (CA)

(72) Inventors: Lihui Guo, St. George (CA); Song Ping Zhou, St. George (CA)

(73) Assignee: PV Technical Services Inc., Saint George (CA)

( * ) Notice: Subject to any disclaimer, the term of this patent is extended or adjusted under 35 U.S.C. 154(b) by 0 days.

(21) Appl. No.: 18/559,355

(22) PCT Filed: Jun. 29, 2021

(86) PCT No.: PCT/CA2021/050896
§ 371 (c)(1),
(2) Date: Nov. 7, 2023

(87) PCT Pub. No.: WO2022/133576
PCT Pub. Date: Jun. 30, 2022

(65) Prior Publication Data
US 2024/0235458 A1      Jul. 11, 2024

(51) Int. Cl.
*H02S 20/25* (2014.01)
*F24S 25/632* (2018.01)
*F24S 25/634* (2018.01)
*H02S 20/23* (2014.01)
*H02S 30/00* (2014.01)
*H02S 30/10* (2014.01)

(52) U.S. Cl.
CPC ............ *H02S 20/25* (2014.12); *F24S 25/632* (2018.05); *F24S 25/634* (2018.05); *H02S 20/23* (2014.12); *H02S 30/00* (2013.01); *H02S 30/10* (2014.12)

(58) Field of Classification Search
CPC ....... F24S 25/632; F24S 25/634; H02S 20/23; H02S 20/25; H02S 30/00; H02S 30/10
See application file for complete search history.

(56) References Cited

U.S. PATENT DOCUMENTS

| 6,111,189 A * | 8/2000 | Garvison | H02S 40/36 126/621 |
| 8,276,329 B2 * | 10/2012 | Lenox | H01L 31/04 52/173.3 |
| 2004/0000334 A1 * | 1/2004 | Ressler | E04D 1/2916 52/173.3 |

(Continued)

OTHER PUBLICATIONS

International Search Report and Written Opinion for PCT/CA2021/050896, dated Jun. 30, 2022, 9 pages.

*Primary Examiner* — Jessie T Fonseca
(74) *Attorney, Agent, or Firm* — Chambliss, Bahner & Stophel, P.C.; Stephen D. Adams

(57) ABSTRACT

A solar photovoltaic module comprises a generator body and a support body, and can be repaired in place after installation on a roof by removing and replacing the solar panel laminate from the generator body of the solar module. The support body of the solar module comprises an elongated rail defining an upper tabletop onto which a fastener may be affixed and a lower tabletop to receive the generator body. The solar panel laminate of the generator body is retained by a frame comprising a horizontal front frame element having a hook to engage a support body of another solar module.

8 Claims, 20 Drawing Sheets

(56) References Cited

U.S. PATENT DOCUMENTS

| | | | |
|---|---|---|---|
| 2006/0000178 A1* | 1/2006 | Almy | E04D 1/29 |
| | | | 52/543 |
| 2011/0070765 A1* | 3/2011 | Kobayashi | F24S 25/61 |
| | | | 439/387 |
| 2012/0211252 A1* | 8/2012 | Turziano | F24S 25/61 |
| | | | 174/6 |
| 2014/0260001 A1* | 9/2014 | Kiik | H02S 20/25 |
| | | | 52/173.3 |
| 2016/0285414 A1 | 9/2016 | Asbeck et al. | |
| 2017/0163206 A1* | 6/2017 | Rodrigues | H02S 40/36 |
| 2017/0353144 A1* | 12/2017 | Guo | H02S 30/10 |

* cited by examiner

DETACHABLE ROOF INTEGRATED SOLAR PHOTOVOLTAIC MODULE

TECHNICAL FIELD

The invention discloses a structure of a solar photovoltaic module (solar module for short) that can be used as a roof tile or roof shingle as well.

BACKGROUND ART

U.S. patent Ser. No. 10/749,460 for SOLAR SHINGLE ROOFING KIT, hereinafter referred to as the "460 Patent", discloses a kind of solar photovoltaic module which not only has the power generation function as an ordinary solar photovoltaic module, but also has the function of a roof tile or shingle to protect a building's roof.

The 460 Patent teaches a solar panel laminate and a frame structure. The solar panel laminate is composed of a glass tabletop, a solar cell circuit layer, adhesive layers and a back protective sheet. Sunlight shines on one side of the glass of the laminate and through the glass to reach the solar cells, and the solar cells generate direct current electricity. The frame structure is composed of four sides, front, rear, left, and right around the solar laminate, providing a mechanical strength required by the solar module to be installed on building roof. The frame of the solar module can be prepared by using aluminum profile extrusion technology. It has the advantages of light weight, high strength, high processing accuracy, and low manufacturing cost. This is the reason why aluminum profiles are widely used as frames for ordinary solar modules.

The two horizontal frames of the solar module described in the 460 Patent constitute the front and rear horizontal frames, and the two left and right vertical frames perpendicular to the horizontal frames. Each of frames has a groove body for accommodating an edge of solar panel laminate. The solar panel laminate is permanently fixed by silicone based glue in the groove bodies of the front, rear, left, and right frames. The horizontal rear frame described in the 460 Patent not only has a groove body for accommodating a lateral edge of the solar panel laminate, but also has a tabletop adjacent and parallel to the groove body for a fastener to sit on. The horizontal front frame described in the 460 Patent not only has a retaining groove for accommodating another lateral edge of the solar panel laminate, but also has a ledge to receive and support the horizontal rear frame of a solar module installed on the next lower row. The vertical frames on both sides perpendicular to the horizontal front and rear frames described in the 460 Patent have retaining grooves for accommodating the longitudinal edges of the solar panel laminate. The structure of the vertical left and right frames are mirror images of each other.

Once installed on a roof the solar shingle roofing kit according to the 460 Patent, each solar module partially overlaps the solar module below it in the next lower row on the roof. And, in the lateral installation, two solar modules are placed in parallel without overlapping each other on the roof. When one of the solar modules on roof, say as the target solar module, needs to be removed or replaced due to failure or damage, the solar module which is overlapping on it must be removed first. That overlapping module may be one or two overlapped on the target solar module. If the target solar module is located close to the roof eave, many rows of solar modules will have to be removed in order to take out the target solar module. This will make the replacement cost of failed solar modules be too high.

The failure of, or damage to the solar module comes mainly from the failure or damage of its active solar panel which may consist of a solar panel laminate. Mostly, a solar panel contains the active devices (solar cells) and fragile material like glass. In addition to the loss of quality control in manufacturing, many non-production process reasons can also cause the failure or damage of solar modules installed on a roof. For example, damage may be caused by stepping on them by installers, or by the impact of some heavy objects, or due to being struck by lightning, etc. It is an object of the present invention to provide a solar module from which the solar laminate can be removed and replaced individually without uninstalling the entire solar module from the roof.

The solar modules described in the 460 Patent are each constructed as a whole composite piece and cannot be disassembled without destroying the solar module. A user cannot take the solar laminate out of the solar module and replace it with a new one after the whole solar module array is installed.

It is an object of the present invention, to create a solar module consisting of two detachable parts. The first part is for fixedly connecting to the roof in installation, and the second part is for accommodating the solar panel which is the power generating portion of the solar module and may contain a solar panel laminate.

It is a further object of the present invention to provide a solar module that can be repaired in place after installation on a roof by removing and replacing the solar panel laminate from the solar module. The second characteristic of this invention is that the second part of solar module mentioned above, i.e. the solar panel, can be mechanically detached from the first part of solar module in an installed solar module array on roof. And meanwhile, the first part of solar module will still stay in its location of solar module array on roof after the second part is detached. If a new second part of solar panel is replaced the detached one, what needs to do is to attach it with the first part mechanically with screws, bolts/nuts, snaps, etc. That recovers a whole solar module in its original location in the array on roof.

Therefore, with this invention, to remove or replace a failed solar module does not require the removal of other solar modules in solar module array on a roof. Instead, the user will detach the failed solar panel from the failed solar module and replace it with a new solar panel. The solar panel in this invention may be made from a solar panel laminate as described in the 460 Patent or from a thin film solar panel. For simplicity, the following sections will only refer to solar panels made from solar panel laminate in the description of this invention; however this is not intended to limit the scope of the invention.

The present invention can significantly reduce the maintenance and replacement cost of such solar modules installed on a roof.

SUMMARY OF THE INVENTION

A solar module is provided having a generator body and a support body. The generator body comprises a solar panel laminate and a hook to engage a support body of another solar module. The support body of the solar module comprises an elongated rail defining an upper tabletop onto which a fastener may be affixed and a lower tabletop to receive the generator body. The support body and the generator body are detachably fastened together such that the support body may remain affixed to a roof when the generator body is detached from the solar module. The solar panel laminate of the generator body is retained by a frame comprising a horizontal front frame element having the hook to engage a support body of another solar module. In a first embodiment, the frame of the generator body further comprises a horizontal rear frame having a slot for fastening with the support body, a vertical left frame element and a vertical right frame element.

In a second embodiment of the invention, the solar laminate panel comprises a glass layer defining a slot for fastening with the support body and the frame of the generator body; and the frame of the generator body further comprises a vertical left frame element and a vertical right frame element. In this embodiment one longitudinal edge of the solar panel laminate is not retained by the frame of the generator body.

In a third embodiment, of the invention the frame of the generator body comprises a vertical left frame element defining a hole to accept a fastener to connect with the support body, and a vertical right frame element defining a hole to accept a fastener to connect with the support body.

DETAILED DESCRIPTION ABOUT THE PREFERRED EMBODIMENTS

Figure 1:
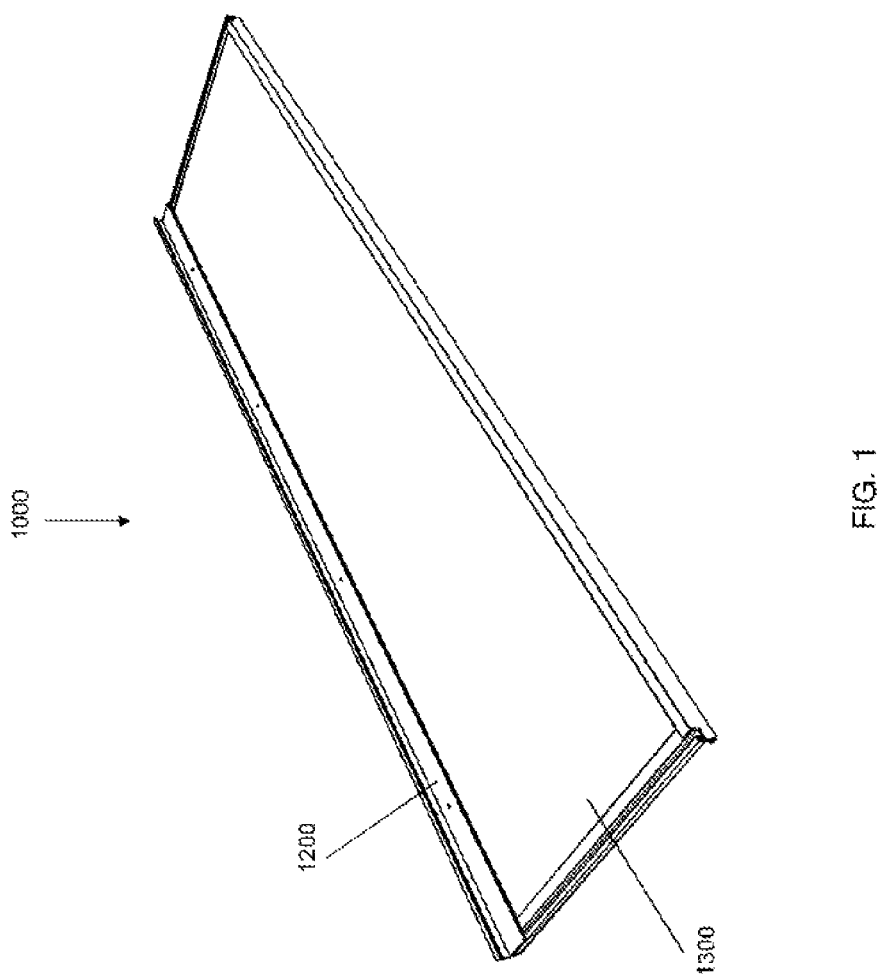
FIG. 1 is a perspective view of a first embodiment of solar module in accordance with the present invention.

FIG. 1 shows a perspective view of a first embodiment of the present invention, a solar module 1000. The solar module 1000 comprises a generator body 1300 and a support body 1200. The generator body 1300 can be separated and conveniently detached from the support body 1200.

The support body may be made from materials with required mechanical strength, such as aluminum profiles or plastic compounds.

Figure 3:
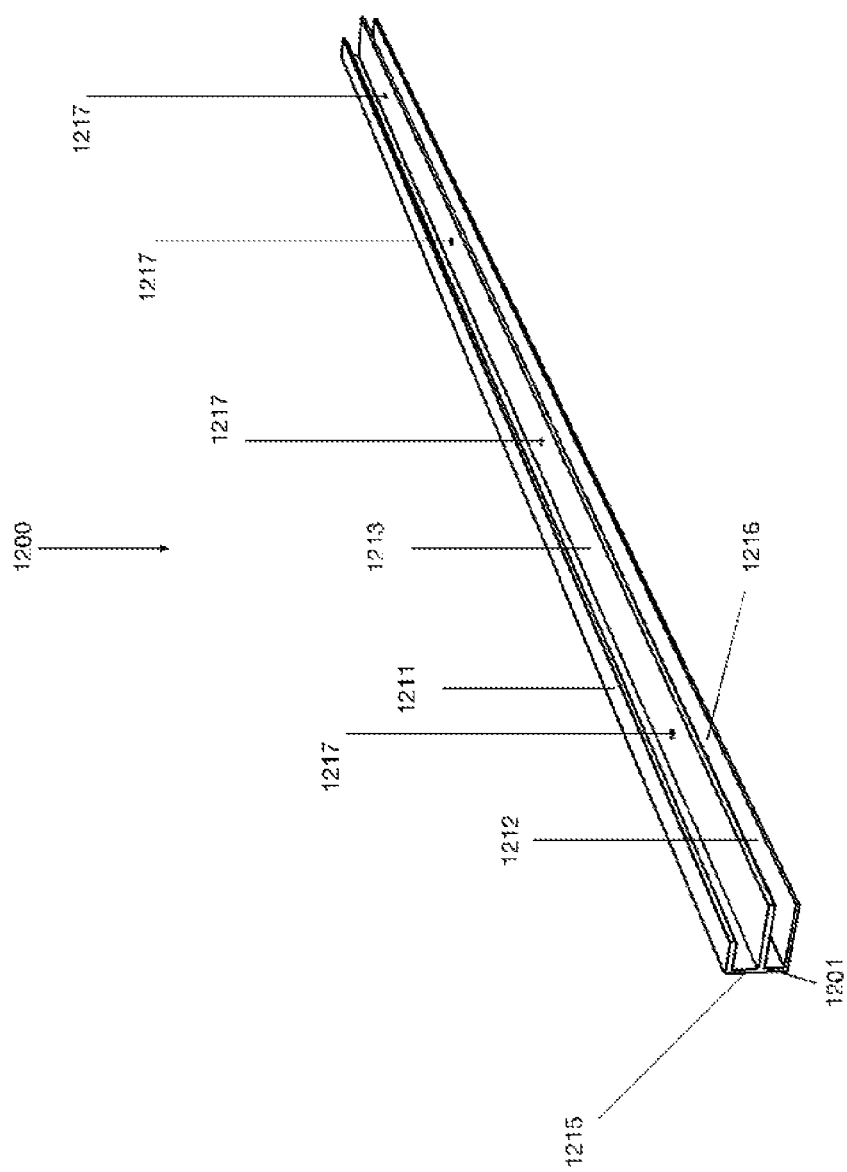
FIG. 3 is perspective view of a support body of the solar module shown in FIG. 1, enlarged to show detail.

A portion of the support body 1200 is shown in FIG. 3 in enlarged detail. The support body 1200 comprises a first elongated rail 1201 defining an upper tabletop 1211 and a lower tabletop 1212. The elongated rail 1201 also defines a ledge 1213. The upper tabletop 1211, the lower table top 1212 and the ledge 1213 are all connected by a vertical wall 1215.

Figure 4:
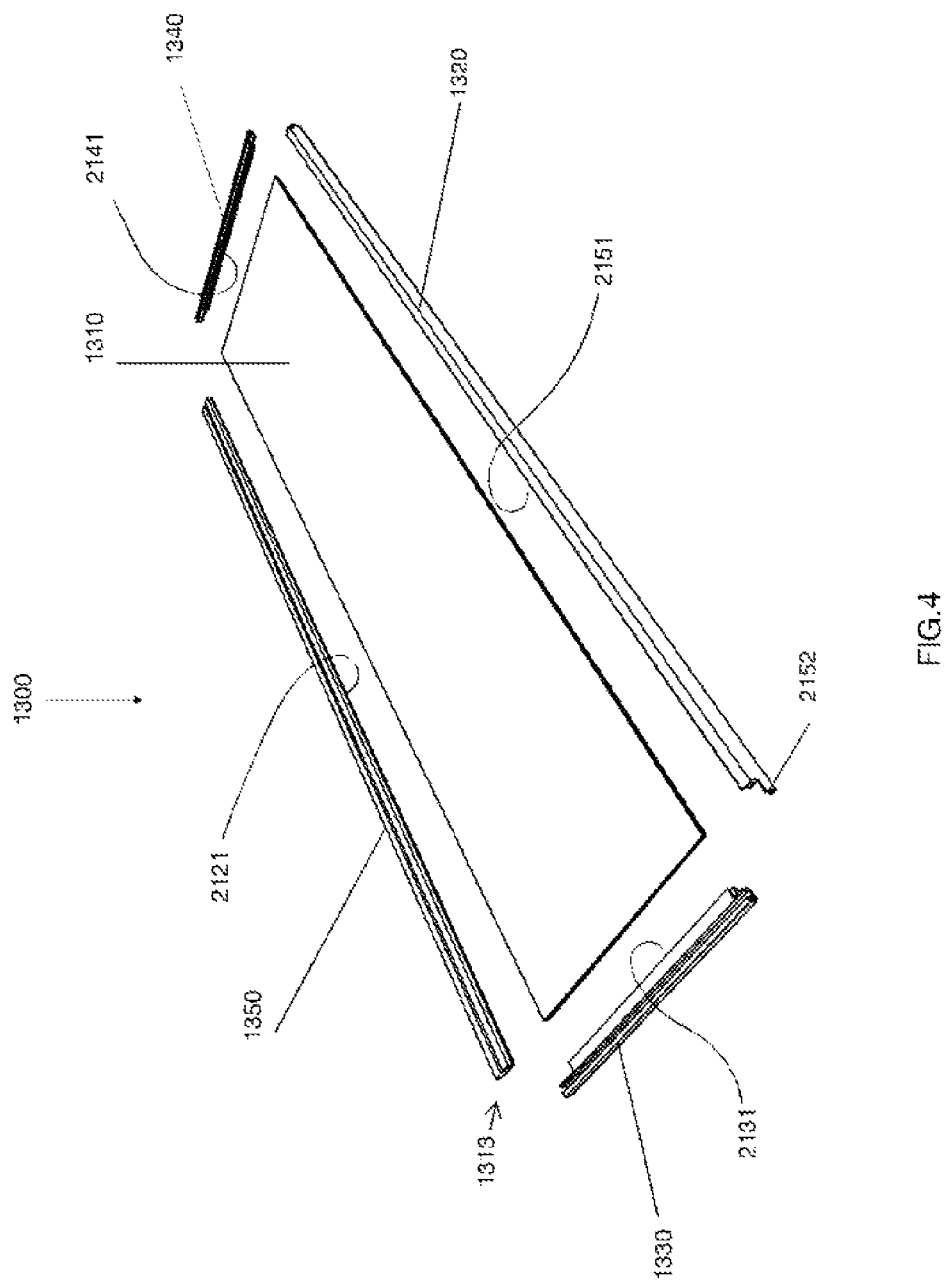
FIG. 4 is a perspective view of a disassembled generator body of the solar module shown in FIG. 1.

The upper tabletop 1211 provides a surface onto which a fastener may be affixed for securing the solar module 1000 to a roof (that will further be explained in the following section), The upper tabletop 1211 also provides a surface for receiving a horizontal hook as shown in FIG. 4 of the generator body of another solar module during installation, that will be explained further below. The lower tabletop 1212 of the first elongated rail 1201 of the support body 1200 is used to receive and connect the generator body 1300. A receiving slot 1216 is formed between the ledge 1213 and the lower tabletop 1212 shown in FIG. 3. The receiving slot 1216 can be used to receive the generator body 1300. The generator body 1300 can be fastened in the receiving slot 1216 by screws 1400 (see FIG. 2) through holes 1217 defined in the ledge 1213.

Figure 2:
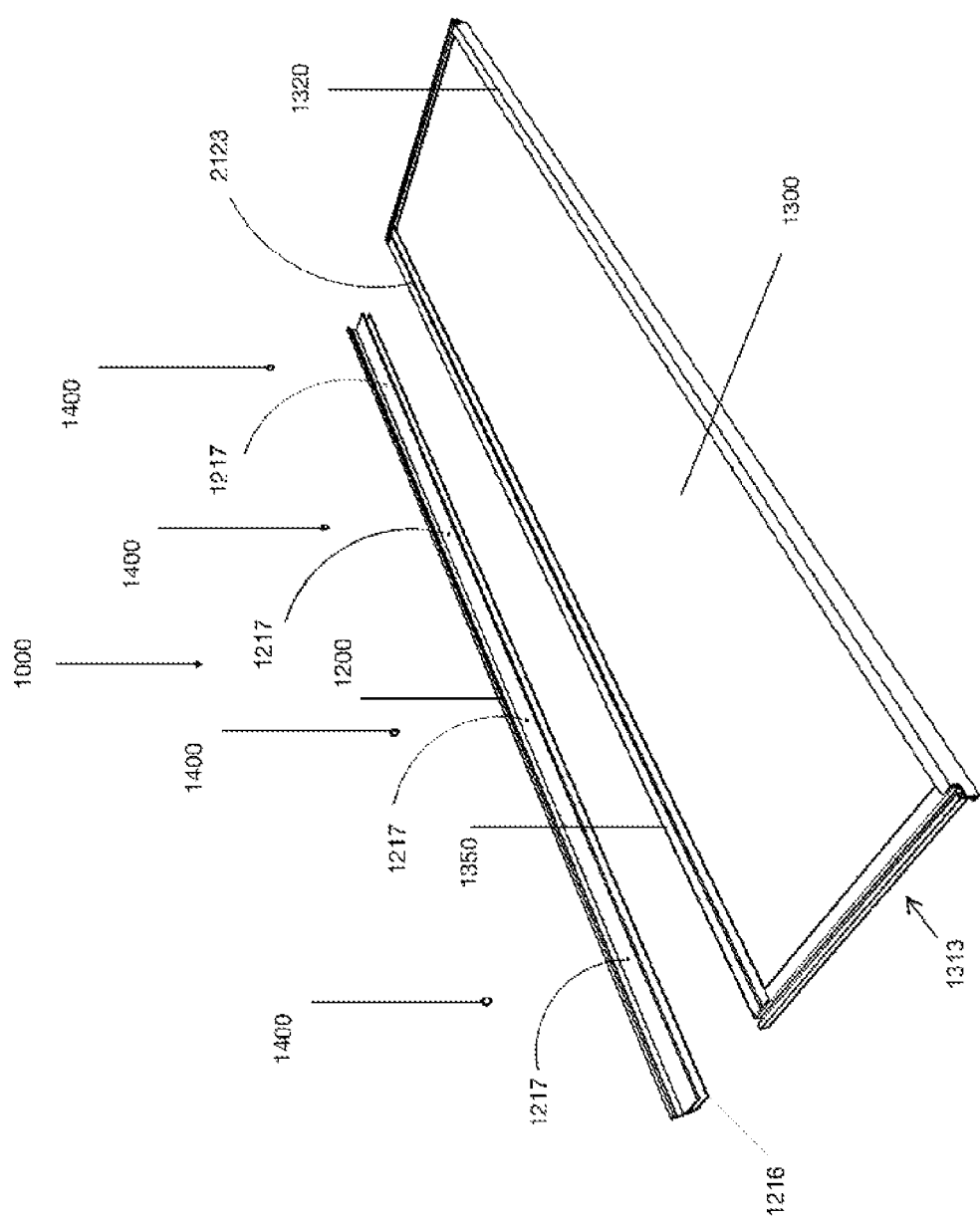
FIG. 2 is an exploded perspective view of a generator body detached from a support body of the solar module shown in FIG. 1.
Figure 5:
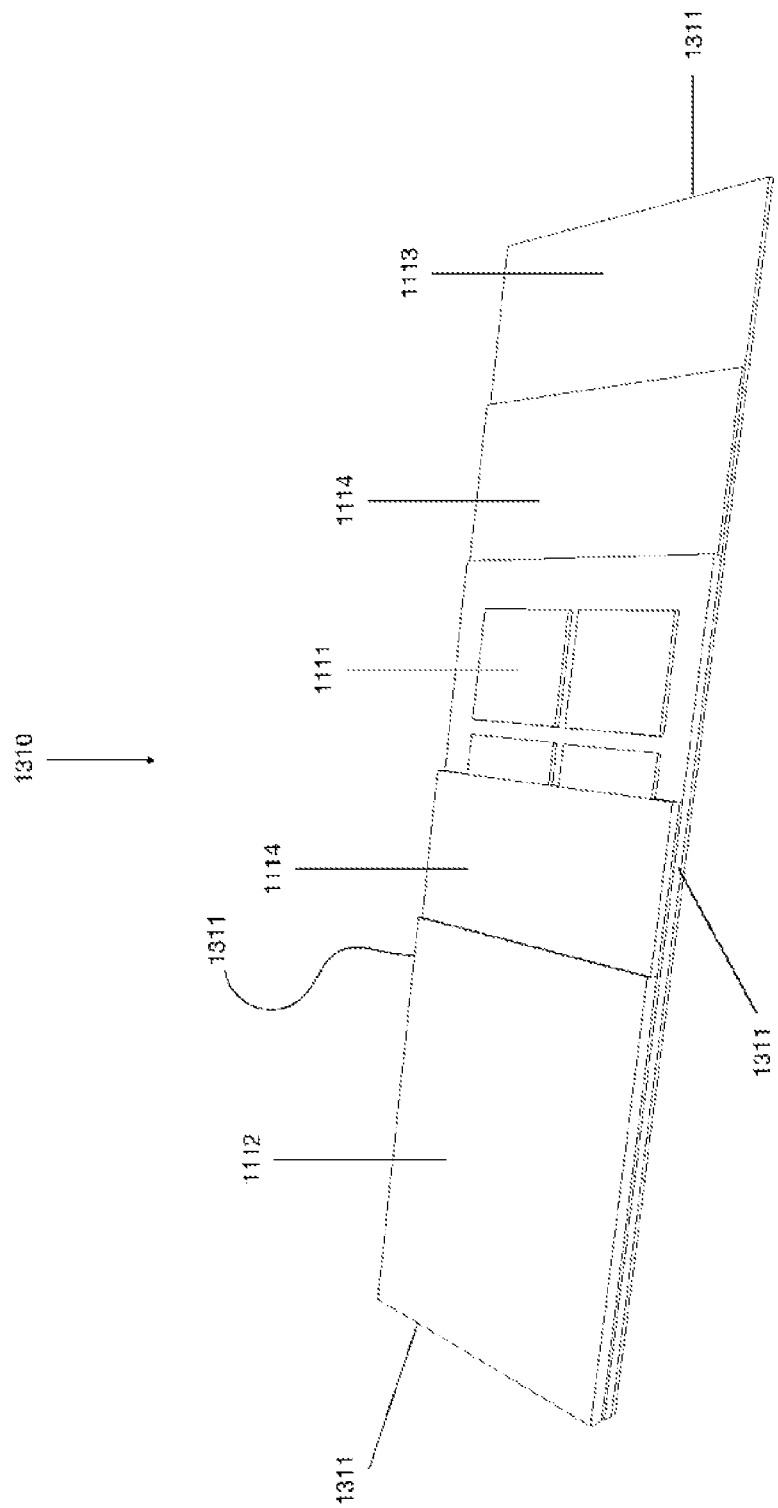
FIG. 5 is a perspective view of the layer structure of a solar panel laminate of a generator body shown in FIG. 4.

The generator body 1300 comprises a solar panel laminate 1310 and a frame 1313 generally indicated by arrow 1313 in FIG. 2. The disassembled generator body 1300 is shown in FIG. 4. The solar panel can be a thin film solar panel made from thin film deposition technology or a solar panel laminate made from crystalline silicon solar cells. Since the solar panel laminate made from crystalline silicon solar cells has a higher and more reliable power output and cost effective advantage, it is preferred to use a solar panel laminate as a solar panel 1310 in this invention. The layered structure of a solar panel laminate 1310 made from crystalline silicon solar cells is shown in FIG. 5. A plurality of solar cells 1111 can be made from crystalline silicon wafer, which plays a role in converting sunlight energy into electrical energy. A glass plate 1112 is the mechanical support of the solar panel laminate 1310 and transmits sunlight into the laminate to reach the surface of the solar cells 1111. A back sheet 1113 can be made from glass or from organic thin film material, which has the function of isolating moisture. One suitable composite from which to form the backing sheet 1113 is a polyvinyl fluoride (PVF) film marketed by DuPont under the trademark TEDLAR. A transparent adhesive layer 1114 is provided on the front and back sides of the solar cell 1111. The solar cells 1111 are encapsulated by the transparent adhesive layer 1114 between the glass 1112 and the back sheet 1113. The transparent adhesive layer 1114 may be made from ethylene vinyl acetate (EVA). The layer structure mentioned above is pressed into a whole piece of solar panel laminate 1310 in a vacuum chamber with a temperature from 110° C. to 140° C.

Returning to FIG. 4, the frame 1313 surrounding the solar panel laminate 1310 has four components: a horizontal rear frame element 1350, a horizontal front frame element 1320, a vertical left frame element 1330 and a vertical right frame element 1340. The four each frame elements have grooves to receive the four edges of solar panel 1310, i.e. front edge, rear edge and two vertical side edges. The frame elements may be constructed from aluminum, fiberglass or compound plastic materials which satisfy the safety requirement of materials for roofs. The frame elements are preferably manufactured by extrusion. Although not seen in the drawings a sealing material is filled into the grooves along with the four edges of solar panel 1310 to prevent the water leakage in gaps between the solar panel laminate and the frame elements. It needs to be noted that, in a view of long term reliability, silicon based silane as sealing material is preferred in situations where the back sheet 1113 is made from organic thin film material. A comparably low cost glue material can be used if the back sheet 1113 made from glass.

Figure 6:
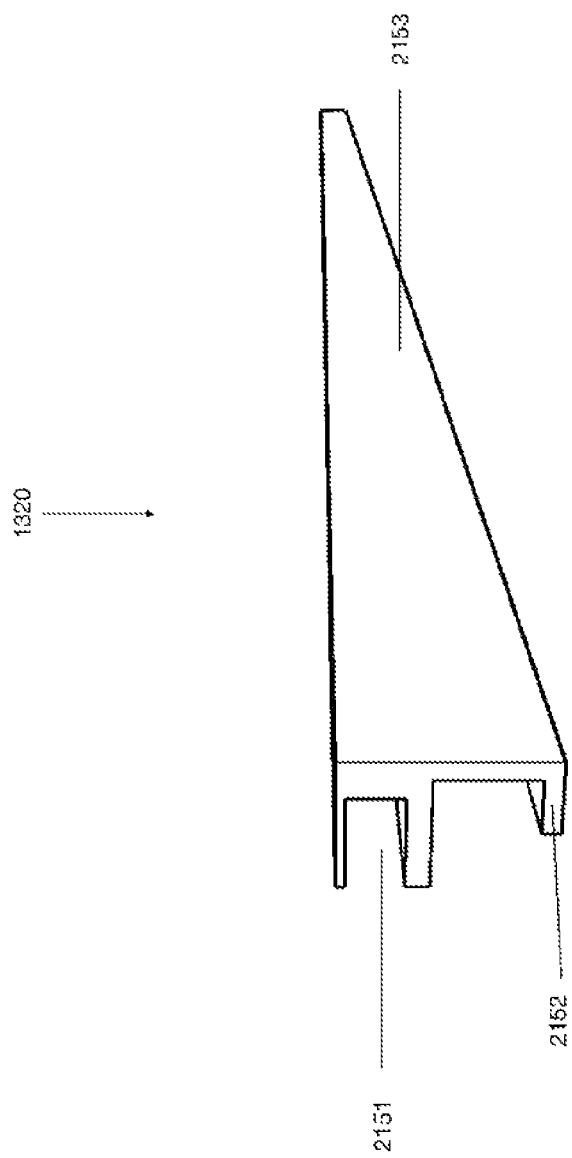
FIG. 6 is the detail perspective view of the horizontal front frame of the generator body in FIG. 4.

FIG. 6 shows detail of the profile of the horizontal front frame element 1320. The front frame element 1320 defines a horizontal groove 2151 to receive and accept a lateral edge of the solar panel 1310, It also defines a horizontal hook 2152 which is parallel to the groove 2151. The horizontal hook 2152 and the groove 2151 are connected by a standing wall 2153.

Figure 7:
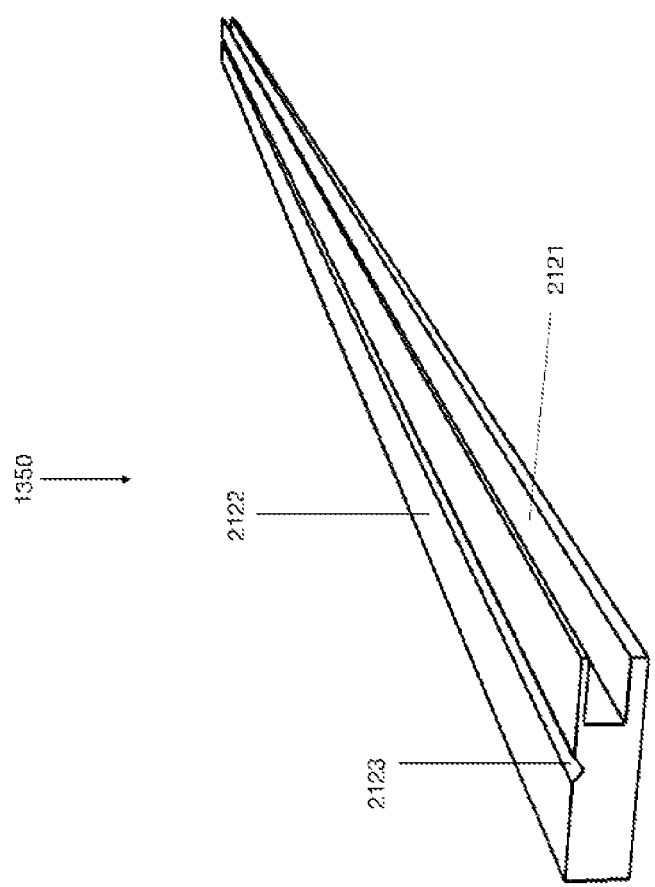
FIG. 7 is the detail perspective view of the horizontal rear frame of the generator body in FIG. 4.

FIG. 7 shows detail of the profile of the horizontal rear frame element 1350. The horizontal rear frame element defines a horizontal groove 2121 to receive and accept another lateral edge of the solar panel 1310. It also defines a tabletop shaped connecting edge 2122, which is sized and positioned to be received in the receiving slot 1216 of the support body 1200 in FIG. 3. As seen in FIG. 7, a V-type groove 2123 is formed on the tabletop 2122 of the horizontal rear frame 1350 to receive the screws 1400 (shown in FIG. 2) passing through the screw holes 1217 on the ledge 1213 of the support body 1200 in FIG. 3.

Figure 8:
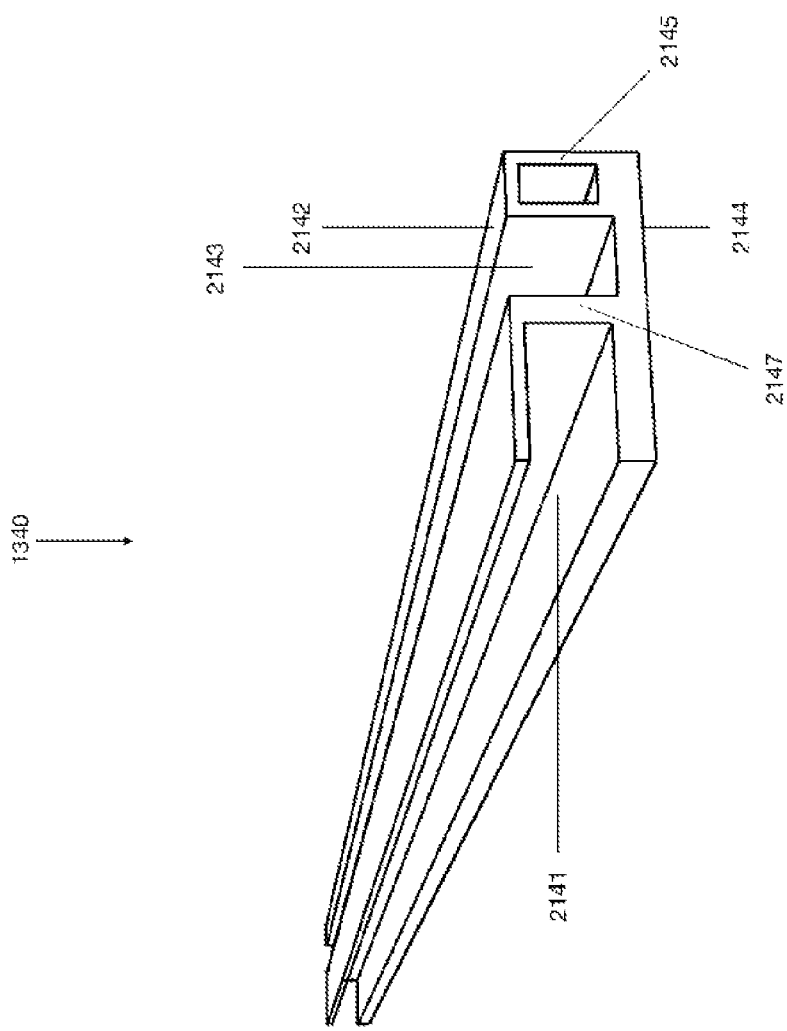
FIG. 8 is the detail perspective view of the vertical right frame of the generator body in FIG. 4.

FIG. 8 shows the vertical right frame element 1340. The vertical right frame element 1340 is an extruded element having a profile which comprises a horizontally extending plate 2144 and a standing wall 2147 extending perpendicular to the plate 2144. The horizontally extending plate 2144 and a first side of the standing wall 2147 together form a groove 2141 to receive and accept a longitudinal edge of the solar panel 1310. A second side of the standing wall 2147 and the horizontally extending plate 2144 define a drainage channel 2143 which runs parallel to the groove 2141. The drainage channel 2143 will carry away any rainwater which may accumulate. A tabletop 2142 may be formed on the top of a second standing wall 2145 to accept a cover plate which is for connecting the vertical left frame of an adjacent solar module at right.

The vertical left frame 1330 (shown in FIG. 40), is a mirror structure body of vertical right frame 1340.

The process for assembling the first embodiment of solar module 1000 in FIG. 2 is as follows.

The solar panel laminate 1310 has been made as explained above with FIG. 5. The generator body 1300 is assembled from the solar panel laminate 1310 and frame elements 1320, 1330, 1340 and 1350, as seen in FIG. 4. The four edges (1311) of laminate 1310 are inserted in to the horizontal groove 2151 of the horizontal front frame element 1320, the horizontal groove 2121 of the horizontal rear frame element 1350, the groove 2141 of the vertical left frame 1340 and the groove 2131 of the right vertical frame 1330 and sealed by silicone based silane material as mentioned above.

The rear frame 1350 of generator body 1300 is inserted into the slot 1216 of support body 1200, as seen in FIG. 2. The screws 1400 are pressed onto the V-shape groove 2123 on the rear frame 1350 of generator body 1300 through the screw holes 1217, which will make the generator body 1300 be unmovable in the slot 1216 of support body 1200. The first embodiment of solar module 1000 in this invention is completed.

In order to detach the generator body 1300 from the support body 1200 the screws 1400 will be loosened and removed from the screw holes 1217.

Figure 9:
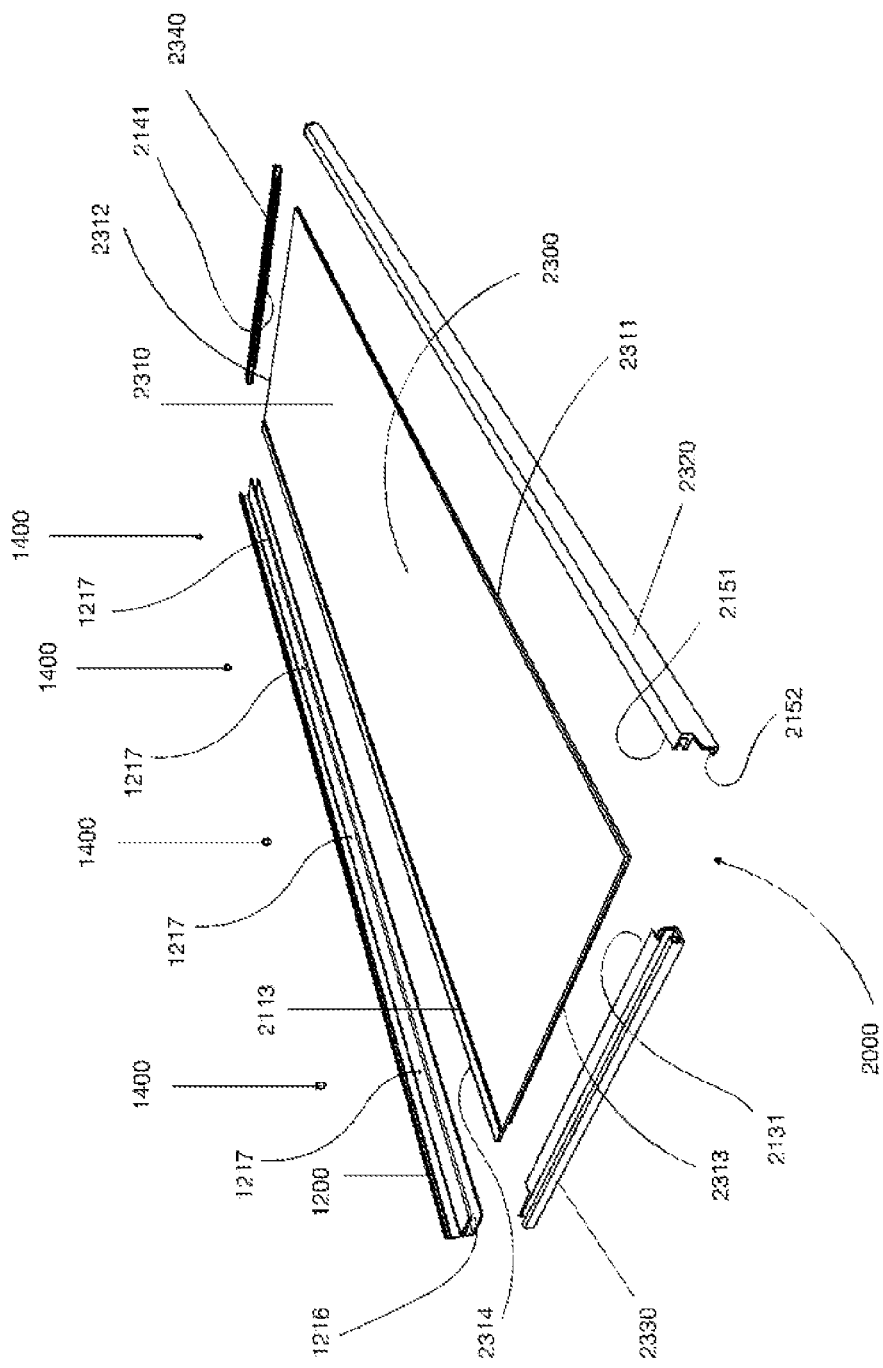
FIG. 9 is an explored perspective view of a second embodiment of solar module in accordance with the present invention.

FIG. 9 shows an exploded perspective view of a second embodiment of the solar module according to the present invention as indicated by reference numeral 2000. The support body 1200 is as same as used in the first embodiment of solar module 1000. In the second embodiment, the solar module 2000 comprises a generator body 2300 which is constructed of three elements of frame instead of four as in the first embodiment: a horizontal front frame element 2320, a vertical left frame element 2330 and a vertical right frame element 2340. Each of the frame elements 2320, 2330, 2340 are used in a manner analogous to that of the corresponding structures in the first embodiment solar module 1000.

Figure 10:
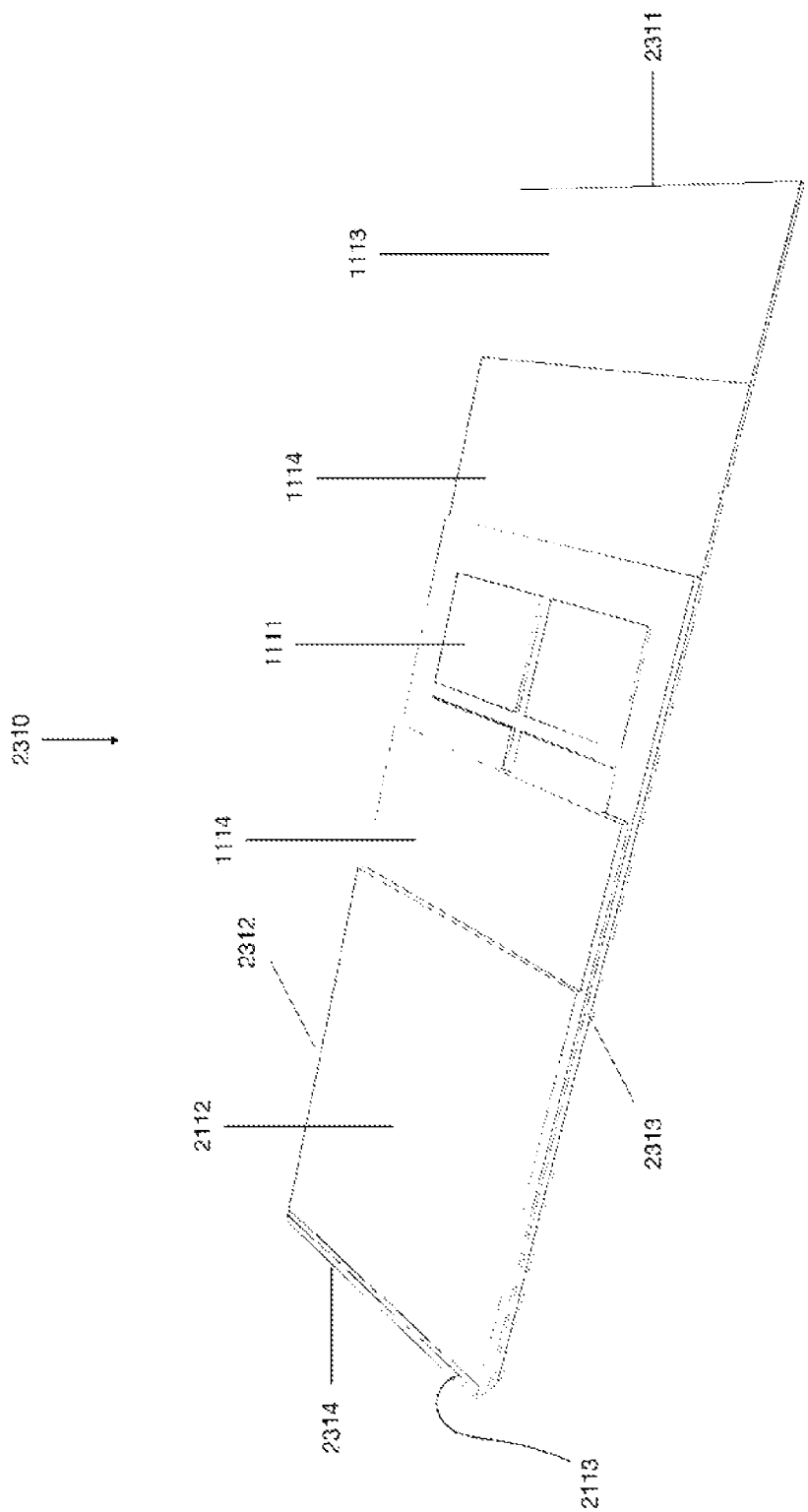
FIG. 10 is a perspective view of the layer structure of a solar panel laminate of a generator body in FIG. 9.

Another difference between the first and second embodiments of the present invention is in the glass panel of solar panel laminate. A comparison of FIG. 5 and FIG. 10 illustrate the difference. The solar panel laminate 2310 comprises a glass layer 2112 having a pre-fabricated V-shape slot 2113 near its rear edge 2314, that will be used in attaching with the support body in the solar module assembling. The V-shaped slot 2113 in glass layer 2112 provides the same function as the slot 2123 of the horizontal rear frame element 1350 in the solar module 1000. The other layers of the solar panel laminate 2310 can be as same as of laminate 1310.

Return to FIG. 9. The generator body 2300 of solar module 2000 will be assembled by inserting a front edge 2311 and two side edges 2312 and 2313 of the laminate 2310 into the horizontal groove 2151 of the horizontal front frame element 2320, the groove 2141 of the vertical right frame 2340 and the groove 2131 of the left vertical frame 2330, respectively. And, the silicone based silane is used to seal between the frame components and the laminate. The assembled generator body 2300 with three frame components 2320, 2330, and 2340 is attached with the support body 1200 by inserting the rear edge 2314 of the laminate 2310 into the slot 1216 of the support body 1200, and by screws 1400 pressing on the V-shape slot 2113 on the laminate 2310 through the holes 1217. The second embodiment of solar module 2000 in this invention is assembled.

The rear edge of laminate 2310 extending into the slot 1216 of the support body 1200 will not be sealed by silicone based silane in order to be detachable. Therefore, in a view of long term reliability of laminate as mentioned above, we prefer to use a glass plate as the back sheet 1113 of the laminate 2310.

In order to detach the generator body 2300 from the support body 1200 the screws 1400 will be loosened and removed from the screw holes 1217.

Figure 11:
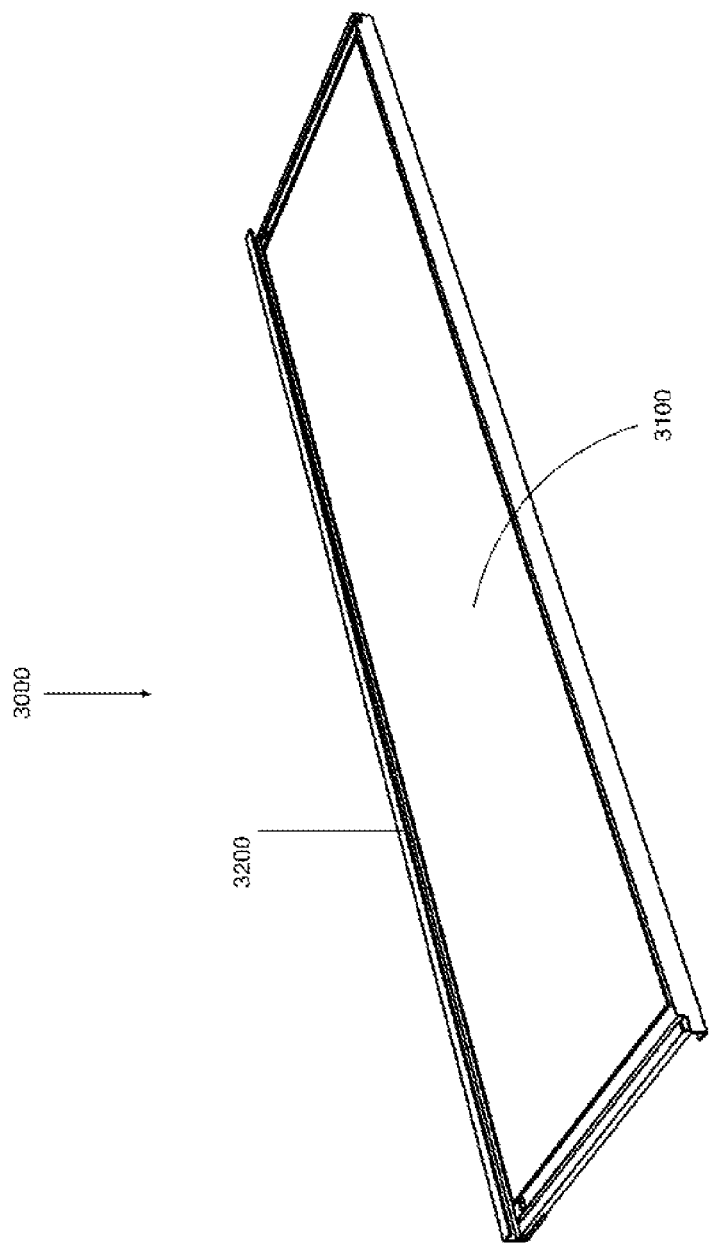
FIG. 11 is a perspective view of a third embodiment of solar module in accordance with the present invention.

FIG. 11 shows a perspective view of a third embodiment of the present invention, a solar module 3000. The disassembled structure of the solar module 3000 is given in FIG. 12. The solar module 3000 comprises a solar panel laminate 1310 which can be as same as used in solar module 1000, a horizontal front frame element 1320 as same as used in solar module 1000. In the third embodiment, the generator body 3100 comprises a first vertical frame element 3330 and a second vertical frame element 3340 which differ from the vertical frame elements used in solar modules 1000 and 2000.

Figure 12:
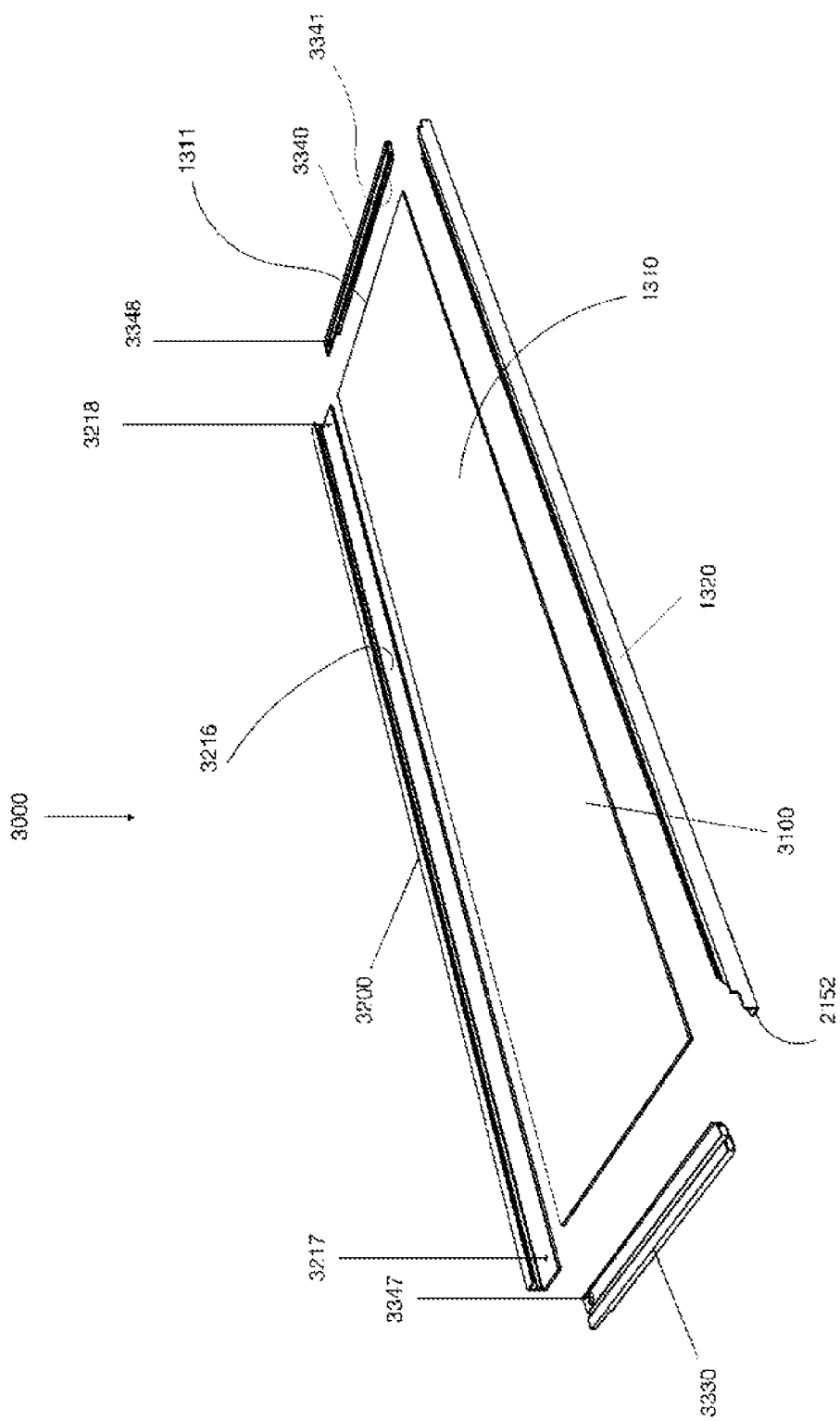
FIG. 12 is an explored perspective view of the disassembled third embodiment of the solar module.
Figure 13:
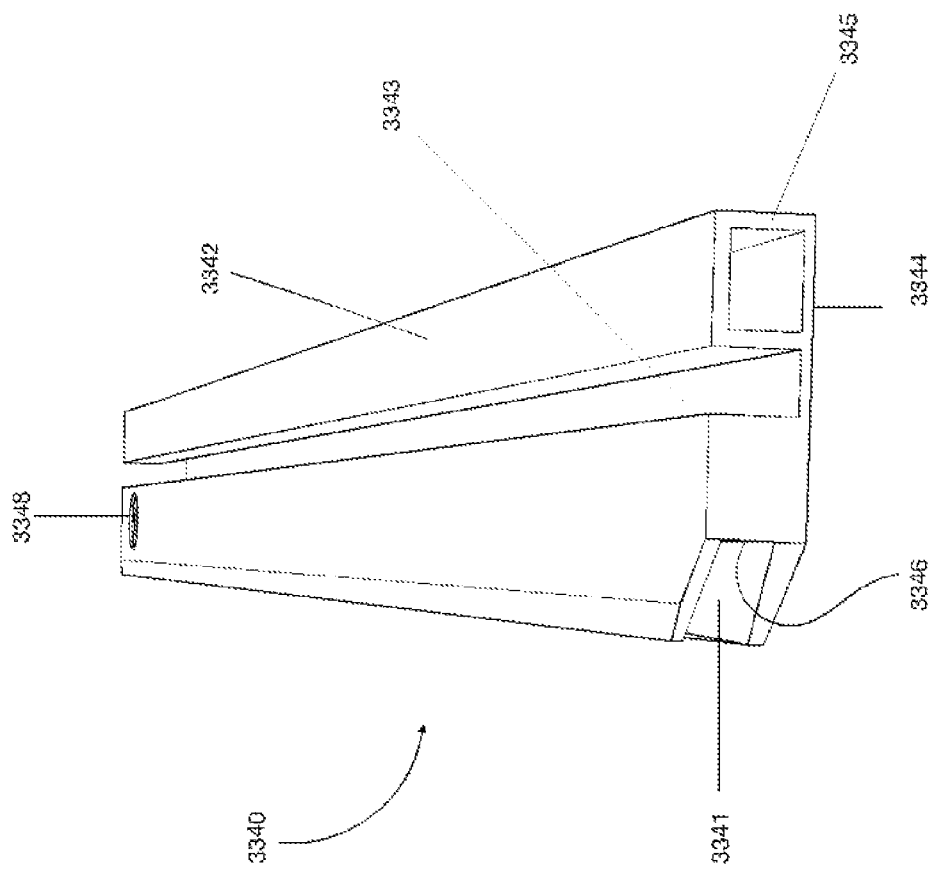
FIG. 13 is an enlarged perspective view of the vertical right frame of the generator body shown in FIG. 12.

As best seen in FIG. 13, the vertical right frame element 3340 is an extruded element having a profile which comprises a horizontally extending plate 3344 and a standing wall 3346 extending perpendicular to the plate 3344. The horizontally extending plate 3344 and a first side of the standing wall 3346 together form a groove 3341 to receive and accept a longitudinal edge 1311 of the solar panel laminate 1310 shown in FIG. 12. A second side of the standing wall 3346 and the horizontally extending plate 3344 define a drainage channel 3343 which runs parallel to the groove 3341. The drainage channel 3343 will carry away any rainwater which may accumulate. A tabletop 3342 may be formed on the top of a second standing wall 3345 to accept a cover plate which is for connecting the vertical left frame of an adjacent solar module at right.

Different to the vertical right frame element 1340 of solar module 1000 and solar module 2000 in FIG. 8, the vertical right frame element 3340 for solar module 3000 defines a hole 3348 to accept a fastener (such as screw 3400) to connect with the support body 3200.

The vertical left frame 3330 shown in FIG. 12, is a mirror structure body of vertical right frame 3340.

Figure 14:
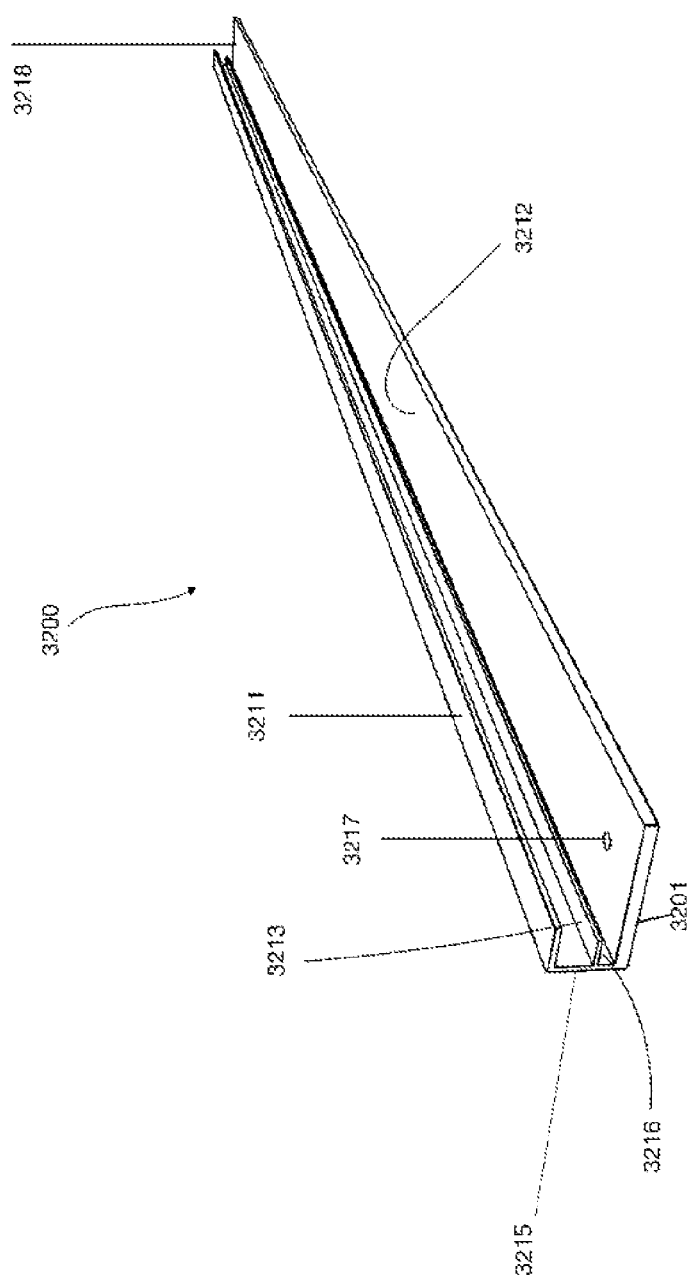
FIG. 14 is an enlarged perspective view of the support body shown in FIG. 12.

FIG. 14 is a perspective view of the structure of support body 3200. It comprises an elongated rail 3201 an upper tabletop 3211 and a lower tabletop 3212 connected by a vertical wall 3215. The elongated rail 3201 also defines a ledge 3213.

The upper tabletop 3211 provides a surface onto which a fastener may be affixed for securing the solar module 3000 to a roof (that will further be explained in the following section). The upper tabletop 3211 also provides a surface for receiving a horizontal hook 2152 (see FIG. 12) of the generator body of another solar module during installation, that will be explained further below. The lower tabletop 3212 of the support body 3200 is used to receive and connect the generator body 3100. A receiving slot 3216 is formed between the ledge 3213 and the lower tabletop 3212 shown in FIG. 14, The receiving slot 3216 can be used to receive the generator body 3100.

One main difference of support of the third embodiment with those in the first and second embodiments is the presence of screw-holes 3217 and 3218 on the lower tabletop 3212 for receiving the screws through the hole 3347 and 3348 as shown in FIG. 12 to connect the generator body 3100.

In the assembling process (see FIG. 12), the generator body 3100 of solar module 3000 will be assembled by inserting the front edge and two side edges of the laminate 1310 (seen in FIG. 5) into the slots of the horizontal front frame element 1320, the vertical left frame element 3330 and a vertical right frame element 3340, respectively. The silicone based silane is used to seal between the frame components 1320, 3330, 3340 and the laminate 1310.

In a view of long term reliability of laminate as mentioned above, the back sheet 1113 of the laminate 1310 in this embodiment will preferably be replaced by a glass plate because the rear edge of laminate 1310 will extend into the slot 3216 of the support body 3200 and not be sealed by silicone based silane.

Figure 15:
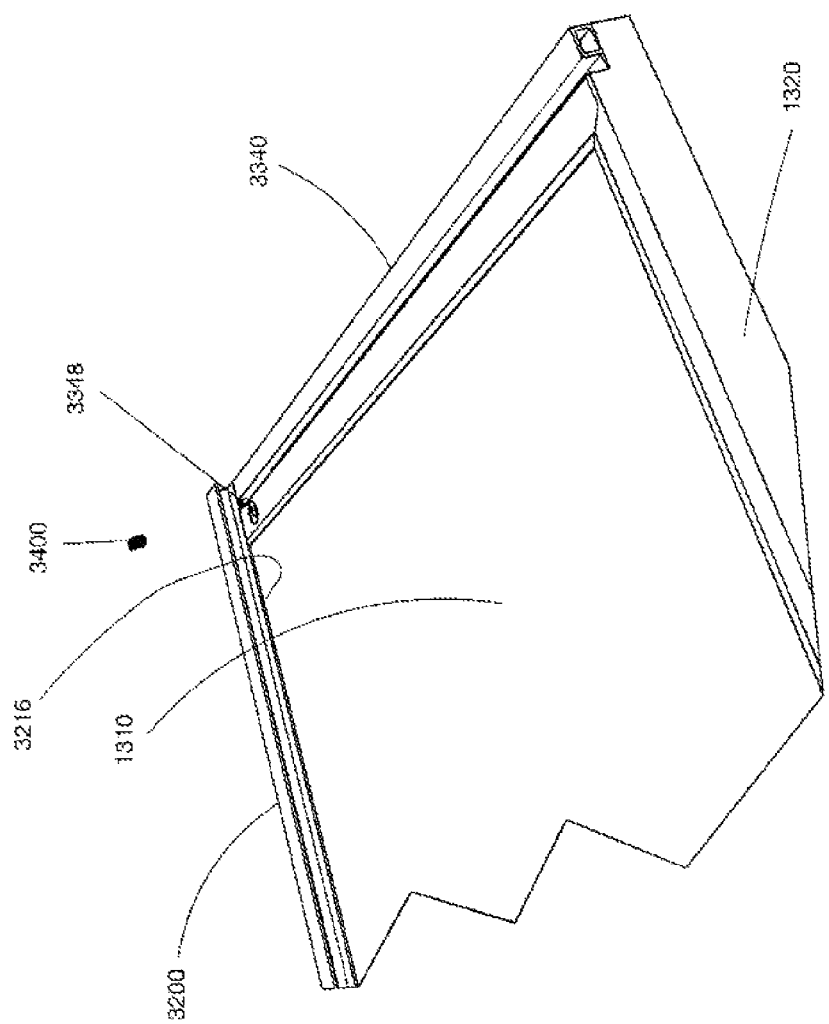
FIG. 15 is partial enlarged perspective view of assembling the generator body with the support body of the third embodiment of solar module shown in FIG. 12.

The assembled generator body 3100 with three frame components is attached with the support body 3200 by inserting the rear edge of the laminate 1310 into the slot 3216 of the support body, and by screws 3400 shown in FIG. 15 through the hole 3348 on the vertical right frame elements 3340 connecting with the underneath screw-holes 3218 on the lower tabletop 3212 of the support body 3200 shown in FIG. 14. The vertical left frame elements 3330 in FIG. 12 can be connected with the support body 3200 in a same way by using screw and holes of 3347 and 3217. The third embodiment of solar module 3000 in this invention is assembled.

In order to detach the generator body 3100 from the support body 3200 the screws 3400 will be loosened and removed from the screw holes 3347 and 3348. It is possible to detach the generator body 3100 from the support body 3200 because the rear edge of the laminate 1310 of the generator body 3100 is not sealed by silicone based silane in the slot 3216 of the support body 3200.

Figure 16:
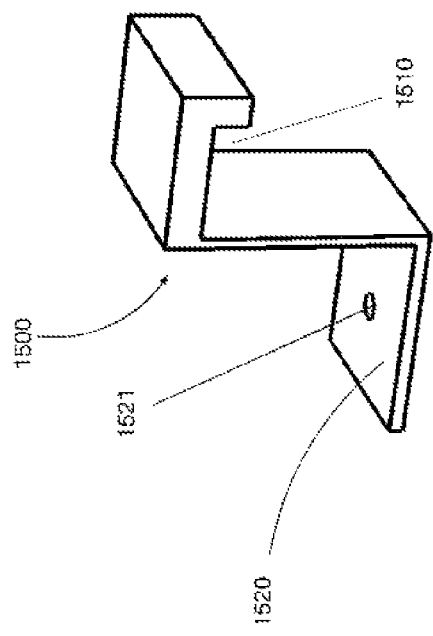
FIG. 16 is an enlarged perspective view of a fastener.
Figure 16B:
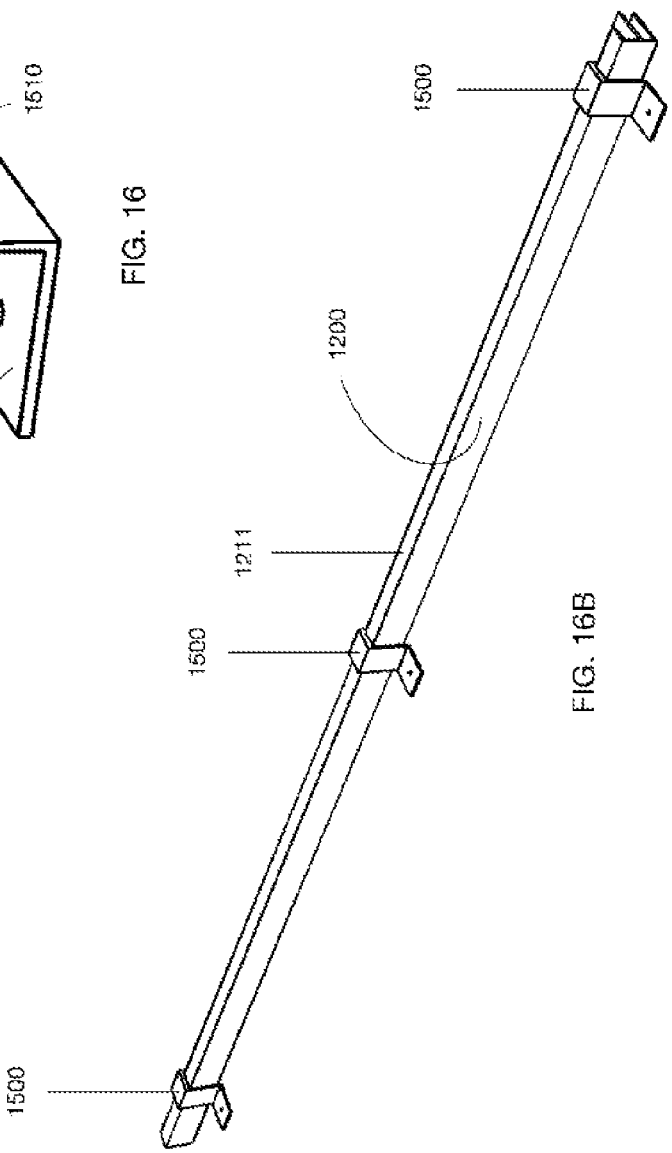
FIG. 16B is a perspective view of a plurality of fasteners fastened on a support body.

To install the invented solar modules, a fastener 1500 is required and is shown in FIG. 16. The fastener 1500 comprises a horizontal plate 1520 which will be attached to a roof surface by screws. Plate 1520 defines hole 1521 therethrough to receive a screw. A groove 1510 of fastener 1500 is for receiving the tabletops 1211 of support 1200 of solar module 1000 and solar module 2000, or tabletops 3211 of support 3200 of solar module 3000. As an example, FIG. 16B shows three fasteners 1500 pressed on the tabletops 1211 of support 1200.

Figure 17:
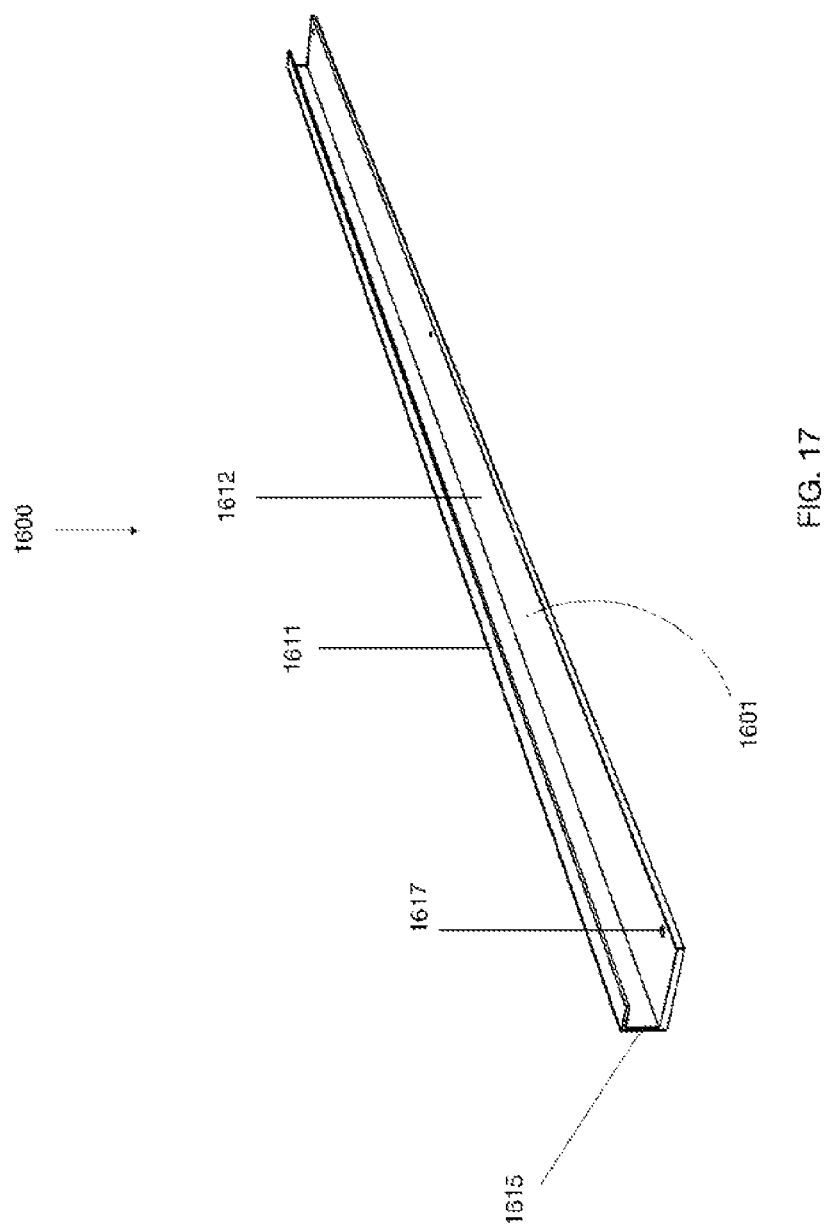
FIG. 17 is the perspective view of a start piece for starting the installation of an array of solar modules according to the present invention.

FIG. 17 is the perspective view of a starting piece 1600 for installing a solar module array from of any of the embodiments 1000 or 2000 or 3000 of the solar module in this invention. The starting piece 1600 comprises an elongated rail 1601 having an upper tabletop 1611 and a lower tabletop 1612 connected by a vertical wall 1615. The tabletop 1612 defines a plurality of holes 1617 therethrough to receive the screws to be fixed on the roof. The tabletop 1611 is for receiving the hook 2152 of a horizontal front frame element 1320 of a solar module in the first row of solar modules installed on roof.

In use the support body will be fixed on the roof surface, and is assembled with generator body through an attachable or locking mechanism, e.g. screw, bolt/nut, lock-key, etc. Such assembly can be conveniently disassembled on roof and the generator body separated from the support body.

The support body of a solar module may have two parallel tabletops that are connected by a vertical wall. One tabletop, the connecting tabletop, of the support body is used to connect with the horizontal rear frame of the generator body. The support body and the generator body are assembled to form a solar module. A second tabletop of the support body is designed to accept a hook from the generator body of another upper solar module in the installation. A fastener will be used to sit on and fasten the said second tabletop of support body on the roof.

The generator body is composed of a solar panel laminate and a frame carrying this solar panel laminate. The frame will provide a portion for connecting with the connecting tabletop of the support body. This portion is called the connected edge. The connecting tabletop and the connected edge can be assembled or attached together by using locking mechanism, e.g. screws, bolts/nuts, buckles, etc., and can be easily disassembled on roof when needed. Thus, the generator body of the solar module can be detached from its support body that is still fixed on roof. The hook on the frame carrying the solar panel laminate of the generator body is parallel to the connected edge of generator body. The hook is located at the horizontal front of generator body, while the connected edge is located at the horizontal rear of generator body.

The solar modules are installed in rows parallel with the roof eave. A cover plate is used to connect the vertical right frame of a solar module at its left side with the vertical left frame of the adjacent solar module at its right side. The cover plate will prevent the water leakage from the connection between two parallel solar modules on roof. The two vertical frames of two adjacent solar modules have the same height and level, and are closely covered by the cover plate.

For the installation of subsequent rows rising vertically toward the ridge of the roof, the hook portion of the horizontal front frame element of the generator body of the upper solar module is used to hook the tabletop of the support body of the lower solar module which has been already fixed on the roof. A fastener is pressed on the tabletop of the support body of the upper solar module, and is fixed on the roof with screws to realize the fixation of the upper solar module on the roof. The process is repeated for the installation of the remaining solar modules from the eave of roof towards the ridge of roof.

In order to detach a target generator body from a solar module that has been already installed on a roof the following steps are performed. The cover plates on the left and right sides of the target solar module are loosened to release the parallel connections with its left and right adjacent solar modules. Then, the generator body and the support body of the target solar module are detached by loosening the screws, bolts/nuts, buckles, etc. When the generator body is removed, the support body of the target solar module remains at the original position on the roof. The steps of replacing or re-assembling a new generator body to the support body are opposite to the above-mentioned detaching steps. First, connect the connected edge of the new generator body with the connecting tabletop of the support body which remains on the roof, and then, connect left and right adjacent solar modules with the cover plates.

As an example, the installation of solar modules 1000 on a roof to form a solar module array will be explained. The same installation methodology can be applied on solar modules 2000 and 3000.

Figure 18:
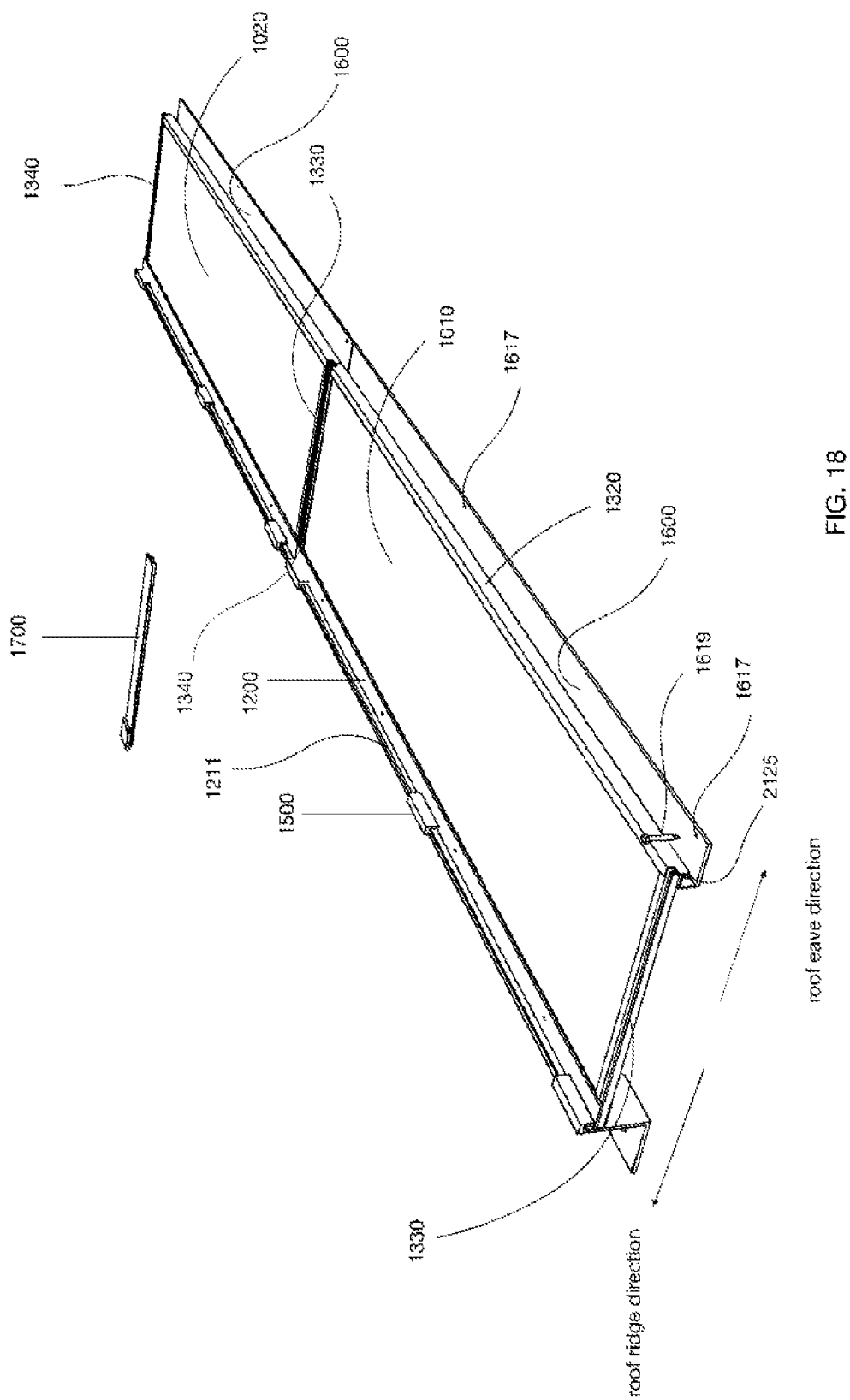
FIG. 18 is the perspective view of two adjacent solar modules in a same row installed horizontally on roof.

The first step is the installation of starting pieces 1600 close to the roof eave as shown in FIG. 18. The starting piece 1600 will be fixed on roof by using screws 1619 therethrough the holes 1617 on the tabletop 1612 (see FIG. 17). Then, the first solar module 1010 hooks the starting piece 1600 by using the hook 2125 on horizontal front frame element 1320 of its generator body. The support body 1200 of solar module 1010 will be pressed by three fasteners 1500 on its upper tabletop 1211 and fixed on roof by screwing the fasteners 1500 on roof. An adjacent solar module 1020 in a same row will be installed in the same way as the installation of solar module 1010.

A cover plate 1700 is placed over the vertical right frame element 1340 of solar module 1010 and the vertical left frame element 1330 of solar module 1020 to prevent rainwater from entering between the two solar modules. The width and length of the cover plate 1700 fully cover the two frame elements 1330, 1340. The vertical right frame 1340 and the vertical left frame 1330 have the same height and in parallel to each other. The water leaking, if any, from the left or right side to the bottom of the cover plate 1700 will be discharged forward through the channels 2143 (see FIG. 8) of the left and right vertical frame elements. Repeat the installation procedures mentioned above to complete the vertical installation of the entire row of solar modules in the horizontal direction on roof.

Figure 19:
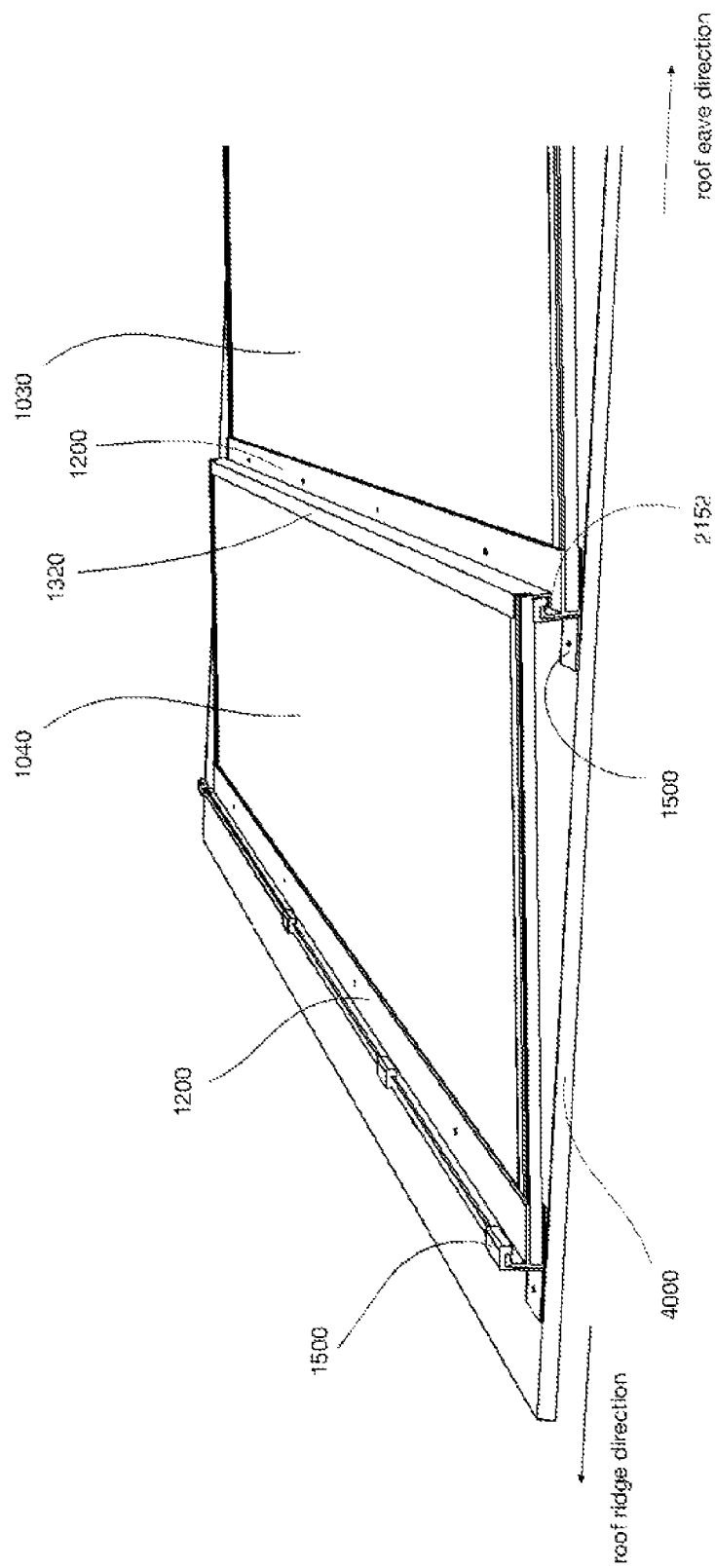
FIG. 19 is a partial perspective view of a solar module in a lower row fastened on roof, and a perspective view of a solar modules in an upper row hooking on a solar module in its adjacent lower row and being fastened on roof.

The installation of two adjacent upper and lower rows of solar modules is explained in FIG. 19. The lower row solar module 1030 is installed on the roof first as same as shown in FIG. 18. The upper row solar module 1040 is installed after the lower row solar module 1030 has been there on roof 4000 in FIG. 19. The horizontal hook 2152 of horizontal front frame element 1320 of upper solar module 1040 sits on the fasteners 1500 and hooks the support body 1200 of the lower row solar module 1030. Like as to fix the lower row solar module 1030 on roof, the upper row solar module 1040 will be fixed on the roof 4000 with three or four fasteners 1500 on the support body 1200 of it, too. Repeat the installation procedures mentioned above to complete the vertical installation of the entire row of solar modules in the longitudinal direction on the roof.

Figure 20:
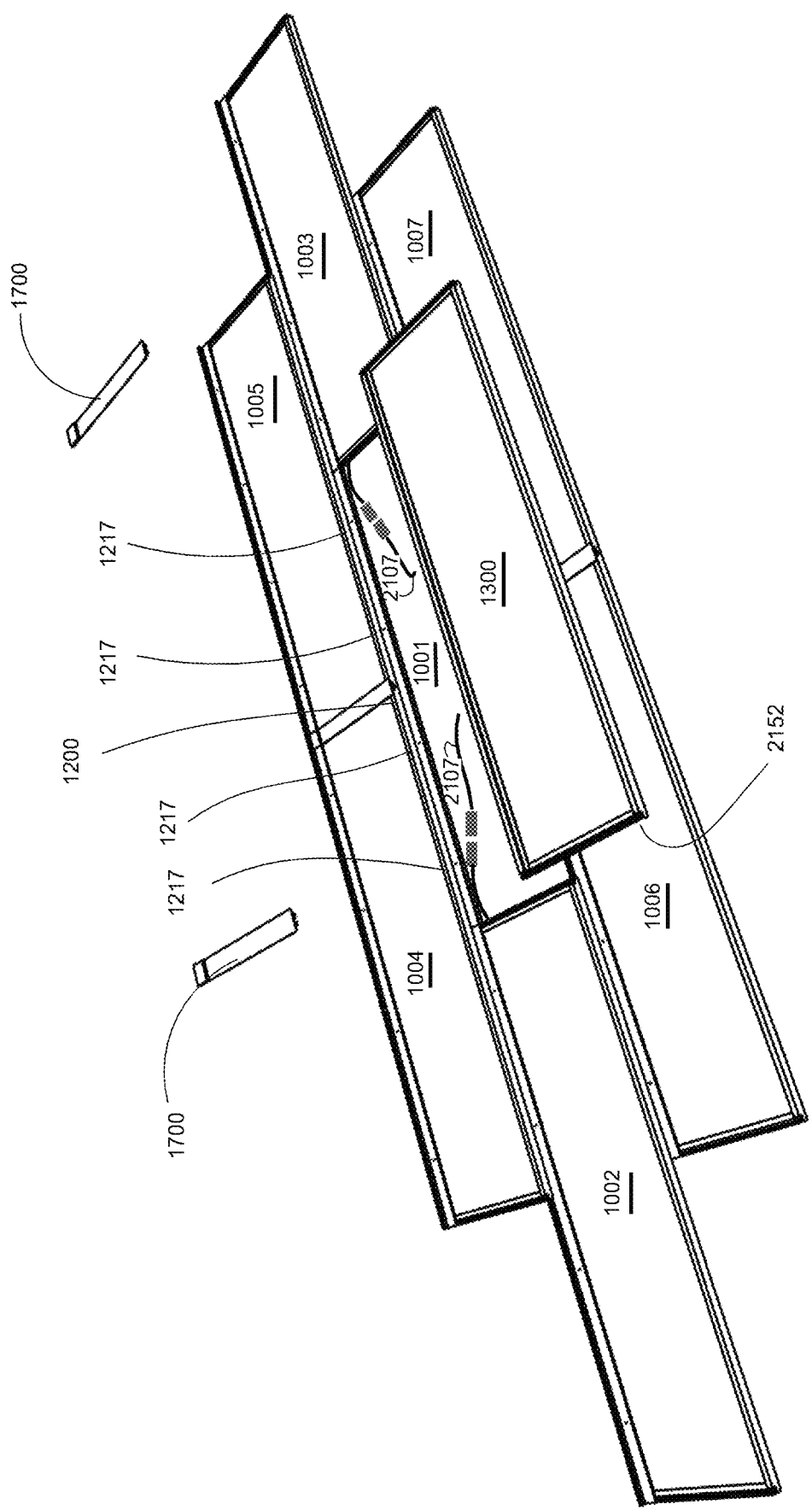
FIG. 20 is the perspective view of a detachable solar module body of one solar module detached from the solar module array on roof.

FIG. 20 shows how to detach and replace the generator body 1300 of a solar module from a solar module array. Reference numeral 1001 identifies the original position of a target solar module to be removed from the array. The horizontal hook 2152 (see FIG. 19) of the solar module hooks and presses on two solar modules 1006 and 1007 in a lower row. Within a single row, the target solar module 1001 was connected in parallel with the modules 1002 and 1003 through the cover plates 1700. The support body 1200 of the module 1001 is fixed on the roof by the fasteners as mentioned above. And the support body 1200 of the module 1001 is also hooked and pressed by the horizontal hook 2152 of solar modules 1004 and 1005 in an upper row. The process of detaching the generator body 1300 of the solar module 1001 starts by removing the cover plates 1700 on both left and right sides, which releases the connection with the solar modules 1002 and 1003. And then, the screws are taken out from the screw holes 1217 to release the generator body 1300 from the support body 1200 of the solar module 1001. The generator body 1300 will be pulled forward; and the horizontal 2152 hook will release from the support body of the solar modules 1006 and 1007. The two electrical cables 2107 from the generator body 1300, one is with positive connector and another with negative connector, which are connected with two adjacent solar modules, e.g. 1002 and 1003, shall be disconnected from the two connectors. The disconnecting operation is a well-known process in solar photovoltaic module field. The removal or detachment operation is completed. The support body 1200 of the solar module 1001 remains and is still fixed on the roof. Meanwhile, it is unnecessary to remove other solar modules surrounding the solar module 1001 during the process of removing the generator body 1300 of the solar module 1001.

The process of reloading or reinstalling a new generator body to the solar module 1001 in FIG. 20 is the reverse operation described above.

We claim:

1. A solar module comprising:
    a generator body; and
    a support body,
        wherein said generator body comprises a solar panel laminate, and a frame comprising a hook to engage a support body of another solar module,
        wherein the support body of the solar module comprises an elongated rail defining an upper tabletop onto which a fastener may be affixed, and a lower tabletop to receive the generator body, and
        wherein the support body of the solar module and the generator body of the solar module being detachably fastened together, wherein one longitudinal edge of said solar panel laminate is not retained by the frame of the generator body, such that the support body of the solar module may remain affixed to a roof when the generator body comprising the solar panel laminate is detached from the support body of the solar module.

2. The solar module of claim 1, wherein the solar panel laminate of the generator body is retained by the frame, said frame comprising a horizontal front frame element having the hook to engage the support body of another solar module.

3. The solar module of claim 2, wherein the frame of the generator body further comprises a vertical left frame element; and, a vertical right frame element.

4. The solar module of claim 2, wherein said solar laminate panel comprises a glass layer defining a slot for fastening with the support body of the solar module; and, the frame of the generator body further comprises a vertical left frame element and a vertical right frame element.

5. The solar module in claim 2, wherein the frame of the generator body comprises a vertical left frame element defining a hole to accept a fastener to connect with the support body of the solar module; and a vertical right frame element defining a hole to accept a fastener to connect with the support body of the solar module.

6. The solar module of claim 3, wherein the vertical left frame element and the vertical right frame element each have a slot to retain said solar panel laminate; and, the vertical left frame element and the vertical right frame element each have a drainage channel parallel to each said respective slot.

7. The solar module of claim 4, wherein the vertical left frame element and the vertical right frame element each have a slot to retain said solar panel laminate; and, the vertical left frame element and the vertical right frame element each have a drainage channel parallel to each said respective slot.

8. The solar module of claim 5, wherein the vertical left frame element and the vertical right frame element each have a slot to retain said solar panel laminate; and, the vertical left frame element and the vertical right frame element each have a drainage channel parallel to each said respective slot.

* * * * *